United States Patent [19]

Oremland

[11] Patent Number: 5,009,786
[45] Date of Patent: Apr. 23, 1991

[54] SELENATE REMOVAL FROM WASTE WATER

[75] Inventor: Ronald S. Oremland, San Francisco, Calif.

[73] Assignee: The United States of America as represented by the Secretary of the Interior, Washington, D.C.

[21] Appl. No.: 428,699

[22] Filed: Oct. 30, 1989

[51] Int. Cl.$^5$ .................................................. C02F 3/30
[52] U.S. Cl. .................................... 210/602; 210/610; 210/630; 210/903; 210/912
[58] Field of Search ............... 210/602, 603, 605, 610, 210/611, 614, 620, 630, 631, 903, 911, 912

[56] References Cited

U.S. PATENT DOCUMENTS

| | | | |
|---|---|---|---|
| 4,519,912 | 5/1985 | Kauffman et al. | 210/611 |
| 4,519,913 | 5/1985 | Baldwin et al. | 210/611 |
| 4,664,804 | 5/1987 | Morper et al. | 210/605 |
| 4,725,357 | 2/1988 | Downing et al. | 210/603 |
| 4,789,478 | 12/1988 | Revis et al. | 210/611 |
| 4,839,052 | 6/1989 | Maree | 210/603 |
| 4,861,482 | 8/1989 | Frankenberger, Jr. et al. | 210/611 |

Primary Examiner—Tom Wyse
Attorney, Agent, or Firm—E. Philip Koltos

[57] ABSTRACT

A method and apparatus for removing selenate from waste water through the use of selenate respiring microorganisms under substantially anoxic conditions is described. The method includes a first zone for removing nitrate by assimilation into biomass. The first zone is maintained under aerobic conditions and is separated from a second zone where selenate is respired to elemental selenium by selenate respiring microorganisms under anoxic conditions. Biomass produced in the first zone may be processed to provide nutrients and electron acceptors for the maintenance of selenate respiring microorganisms when selenate becomes growth limiting. An optional sulfate reduction zone is provided in the method and apparatus where hydrogen sulfide is produced. The hydrogen sulfide so produced is circulated to the second zone and may be used to reduce residual selenite to elemental selenium.

13 Claims, 3 Drawing Sheets

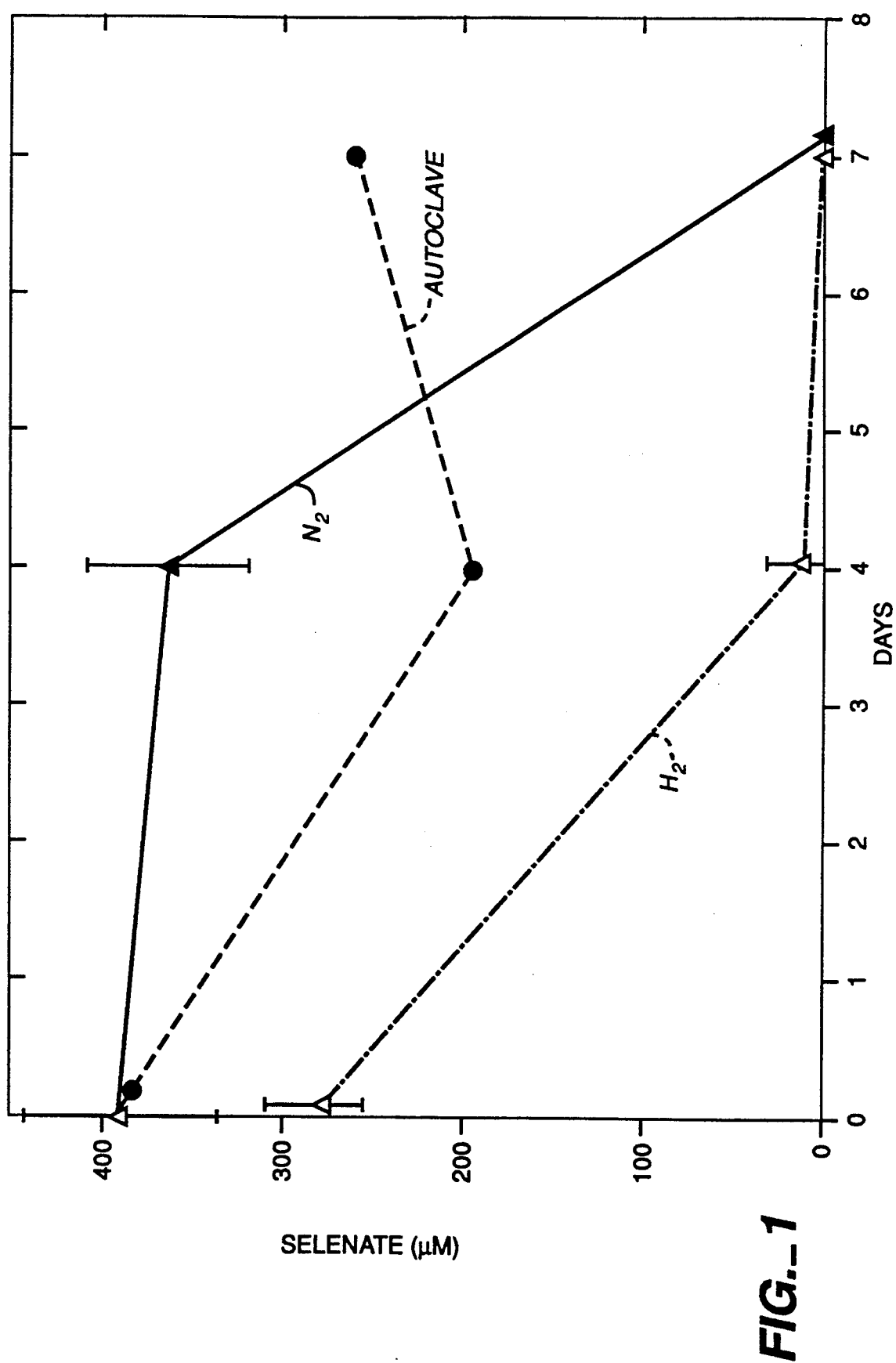
FIG._1

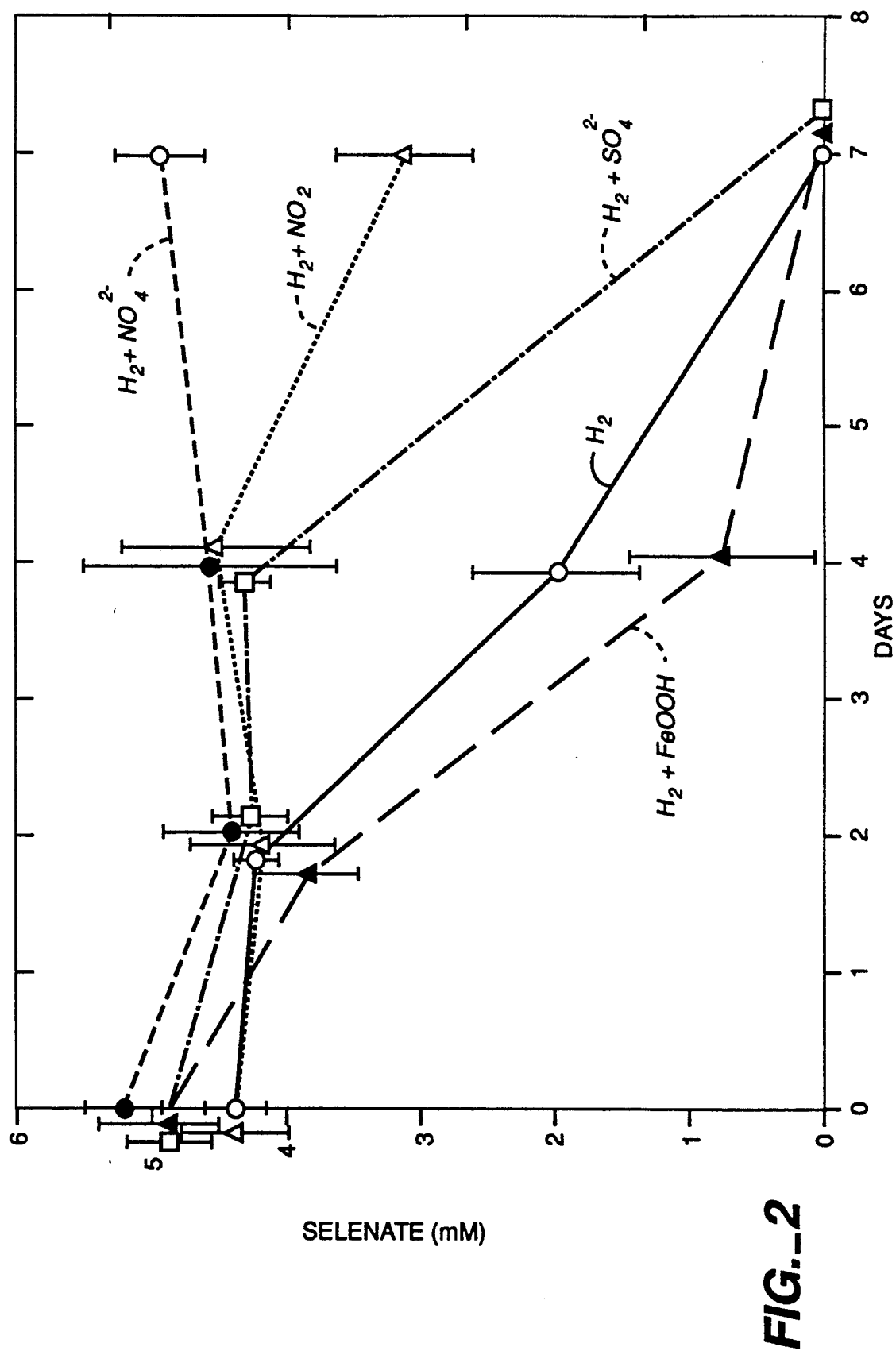
FIG._2

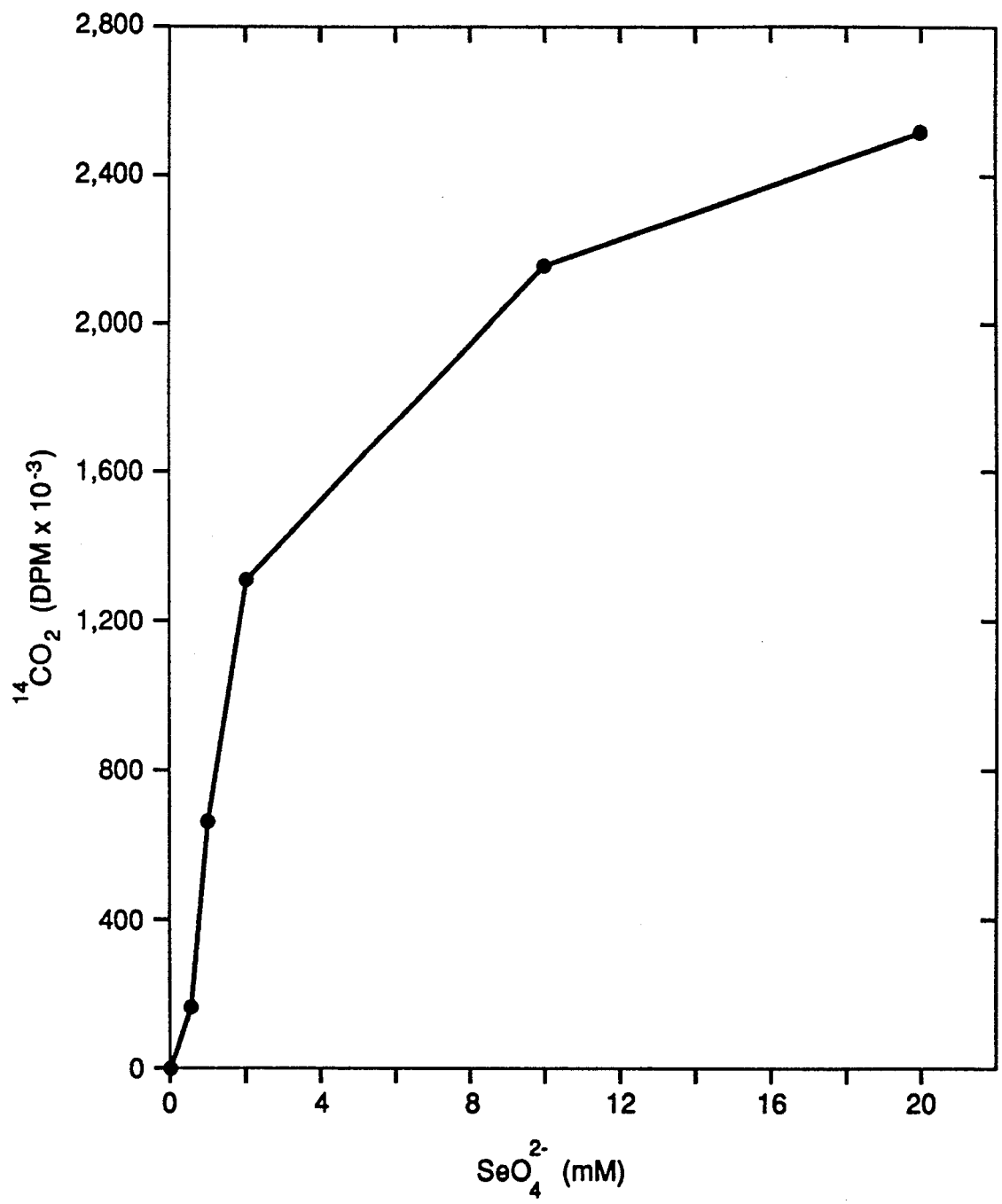
FIG._3

SELENATE REMOVAL FROM WASTE WATER

FIELD OF THE INVENTION

The present invention concerns a process and system for the removal of oxyanions of selenium from waste waters through the action of microorganisms that respire selenate.

BACKGROUND OF THE INVENTION

Oxyanions of selenium have been identified as environmental toxins in drainage waters from irrigated agricultural soils that contain selenium. Presser, T. P., et. al. 1984, U.S. Geological Survey Water Resources Investigations Report 85-4220. This environmental problem is common in many irrigated regions of the western United States of America. Sylvester, M. A., et. al.1988, On Planning Now for Irrigation Drainage Studies, Proc. Amer. Soc. Civil Engin., New York, p. 665-667. Methods for removal of selenium oxyanions offer the prospect of restoring water or soil quality while allowing for the continuation of irrigated farming and have therefore received attention.

Baldwin et. al., U.S. Pat. No. 4,405,464, discloses a purely chemical process for reducing selenate to a lower oxidation state by treating aqueous selenate solutions with iron under pH conditions favoring the formation of a precipitate of an iron hydroxide and some amount of elemental selenium. Baldwin et. al. U.S. Pat. No. 4,405,464 does not, however, suggest the use of any biological process in the production of elemental selenium from waste waters containing selenium oxyanions.

Baldwin et. al., U.S. Pat. No. 4,519,913, discloses a process for the removal of selenium from contaminated water using microorganisms of the genus Clostridium. According to the disclosure, the process is run under anaerobic conditions and selenium is produced in a recoverable form. The process, however, is suited to industrial or mining waste water and does not provide for any way of maintaining the process using waste waters that contain chemical species that inhibit selenate reduction to selenium. In particular Baldwin et. al., U.S. Pat. No. 4,519,913, fails to disclose any method for coping with nitrate ion which inhibits the reduction of selenate to selenium.

Downing et. al., U.S. Pat. No. 4,725,357 also discloses a microbial process for the removal of selenium and suggests the desirability of removing nitrate to a level of 5 milligrams per liter or less prior to the treatment of the selenium-containing waste water. Downing et. al. however, does not specify an operational range below 5 milligrams per liter nitrate where practical levels of removal of selenate can occur. Furthermore, Downing et. al. does not suggest that the nitrate is removed by biomass assimilation of the nitrate under aerobic conditions. In addition, although Downing et. al. discloses that exogenous nutrients may have to be supplied to the microorganisms in the reactor where selenate is reduced, there is no suggestion that the biomass used to assimilate nitrate can also be processed and circulated into the reactor to serve as the nutrient source for the microorganisms in the reactor. The requirement of using exogenous nutrients (including electron donors) as discussed in Downing et. al. adds substantial cost to running the process. In addition, although Downing et. al. discloses that microorganisms are useful for the removal of selenate, there is no suggestion that such microorganisms in fact respire selenate. Downing et. al. also teaches that it is not necessary to seed the reactor with selenate utilizing organisms and that optimal selenate-utilizing microorganisms can be obtained in the reactor merely by populating the reactor with selenate utilizing organisms from any source.

Kauffman et. al., U.S. Pat. No. 4,519,912 also discloses a microbial process for the removal of selenium ion from waste waters, however the process according to the disclosure requires the action of Desulfovibrio and other sulfate reducing microorganisms in the presence of sulfate to produce hydrogen sulfide. The process of Kauffman et. al., however cannot be run at high concentrations of selenate that may exist in some agricultural waste waters after evaporation, because such high concentrations of selenium are toxic to the sulfate utilizing microorganisms. The process of Kauffman et. al. is not independent of sulfate metabolism.

Zehr, J. P., and Oremland, R. S. 1987, Reduction of Selenate to Selenide by Sulfate-Respiring Bacteria: Experiments with Cell Suspensions and Estuarine Sediments. Appl. Environ. Microbiol. 53:1365-1369., disclosed that washed cell suspensions of Desulfovibrio desulfuricans subsp. aestuarii were capable of reducing nanomolar levels of selenate to selenide as well as sulfate to sulfide. More importantly, these reductive process were inhibited by 1 mM selenate. Furthermore, the addition of 1 mM sulfate decreased the reduction of selenate and enhanced the reduction of sulfate, demonstrating that increasing concentrations of sulfate inhibited selenate reduction but enhanced sulfate reduction rates. Measurements of the reduction of picomolar amounts of selenate by sulfate reducing microorganisms indicated that less than 0.1% of the selenate is converted to selenide ($Se^2$) even in the presence of lactate and $H_2$. The authors indicate that these observations suggest that a reaction other than direct reduction by sulfate reducing bacteria occurs. These results cast doubt upon the teaching of Kaufmann et. al. mentioned above.

Oremland et. al., 1989., Selenate Reduction to Elemental Selenium by Anaerobic Bacteria in Sediments and Culture: Biogeochemical Significance of a Novel, Sulfate-Independent Respiration. Appl. Environ. Microbiol. 53:1365-1369., disclosed a microbial process that removes oxyanions of selenium from water through microbial respiration and produces elemental selenium under anaerobic conditions. Oremland et. al. also discloses that the removal of selenate under these conditions is substantially inhibited by 10 mM nitrate.

SUMMARY AND OBJECTS OF THE INVENTION

It has been discovered that the microbial process for removing oxyanions of selenium from water that proceeds through microbial respiration to produce elemental selenium under anaerobic conditions is almost completely inhibited by even low concentrations of nitrate, about 1 mM, in waste water. Surprisingly an efficient process for removing oxyanions of selenium by selenate respiring microorganisms may be obtained according to the invention by reducing the nitrate concentration well below 1 mM. In the process according to the invention, the required lowering of the nitrate concentration in selenium- and nitrate- containing waste water may be accomplished by employing a nitrate utilizing biomass under aerobic conditions in a first treatment zone to remove nitrate. The first treatment zone is separated from a second treatment zone where the microbial respiratory removal of oxyanions of selenium from waste water takes place under anoxic conditions. The efficiency of the process is further enhanced by seeding the treatment zone where the microbial respiratory removal of oxyanions of selenium from waste water takes place with a culture of microorganisms enriched for selenium respiring microorganisms. Additional improvement of the process according to the invention ay be obtained by adapting the seed culture of microorganisms enriched for selenium respiring microorganisms to the chemical conditions, in particular conditions of salinity and pH that are similar to those of the waste water to be treated in the selenate removal process according to the invention. Appropriate seed cultures may be obtained by sampling various environments for appropriate initial inocula for the seed culture.

Further improvements in the efficiency of the process can also be achieved in the method and system according to the invention by processing the biomass accumulated in the first treatment zone and feeding the processed biomass as a nutrient stream into the microbial population that carries out the respiratory removal of oxyanions of selenium from waste water. By using process biomass from the first treatment zone as a nutrient stream, a substantial operational savings in the cost of carrying out microbial selenium removal is achieved by substantially eliminating the expense of exogenous supply of organic matter to drive the reaction. In a further improvement of the invention, hydrogen sulfide, produced by sulfate respiring microorganisms is circulated into the treatment zone where the microbial respiratory removal of oxyanions of selenium from waste water takes place. The hydrogen sulfide provides an additional source of reducing potential which helps to increase the yield of elemental selenium in the process according to the invention.

It is an object of the invention to provide a method for the removal of oxyanions of selenium from waste waters wherein said waste waters comprise oxyanions of selenium and nitrate.

Another object of the invention is to remove oxyanions of selenium from waste waters by the biological reduction of oxyanions of selenium to elemental selenium by the use of microorganisms that respire oxyanions of selenium under anoxic conditions.

A further object of the invention is to remove oxyanions of selenium from waste waters by the biological reduction of selenate ultimately to elemental selenium by the use of microorganisms that respire selenate under anoxic conditions, without supplying to the selenate respiring microorganisms exogenous nutrients in addition to those produced by biological organisms from the waste water under treatment.

It is a further object of the invention to remove oxyanions of selenium from waste waters by the biological reduction of selenate ultimately to elemental selenium so that the concentration of oxyanions of selenium in the waste water treated according to the invention is substantially reduced to a range about 0.01 to 0.001 mg/l.

It is yet another object of the invention to provide a method for enhancing the removal of oxyanions of selenium from waste waters that also include sulfate ions by biologically reducing said sulfate to hydrogen sulfide and using the hydrogen sulfide produced thereby to provide additional reducing potential and to further reduce any residual selenite to elemental selenium.

It is a still further object of the invention to provide a method for enhancing the removal of oxyanions of selenium from waste waters by use of selenate respiring microorganisms adapted to the chemical conditions, particularly pH in a range from about neutral to very alkaline (about pH 10) and salinity in a range of fresh water about 1 gram per liter to hypersaline (about 100 grams per liter), of the selenate contaminated waste water to be treated.

These and other objects of the invention will become more readily apparent to those familiar with the art from the following detailed description of the invention.

BRIEF DESCRIPTION OF THE FIGURES

FIG. 1 shows the removal of added selenate from slurries incubated under $H_2$ or $N_2$ or in an autoclaved control. Points represent the mean of three samples, and bars indicate 1 standard deviation (only one autoclaved control was run).

FIG. 2 shows the removal of added selenate from sulfate-free sediment slurries incubated under H, in the presence of various competitive electron acceptors. Points represent the mean of three samples and bars indicate 1 standard deviation.

FIG. 3 shows Selenate-linked respiration of [2-$^{14}C$]acetate by strain isolate SeS after 28 days of incubation in medium initially containing 20 mM selenate and 20 mM acetate.

DETAILED DESCRIPTION OF THE INVENTION

The present invention provides a system for the removal of dissolved selenium from agricultural waste waters which may be contaminated with a variety of dissolved chemical species, including species of sulphur, selenium, phosphorus and nitrogen. The chemical species include sulphate, oxyanions of selenium, including selenite ($SeO_4^{2-}$) and selenite ($SeO_3^{2-}$), arsenate and nitrate. Although waste waters from a variety of mining and industrial processes include chemical species of selenium and could be treated using the system according to the invention, the following description of the invention is particularly suited for treatment of agricultural waste waters, which may include significant concentrations of nitrate and phosphate as a result of the use of chemical fertilizers on crop land. In addition, such waste waters may have significant saline content, including dissolved chloride, sulfate and nitrate salts of arsenic, sodium and potassium, and in addition may be highly alkaline having a pH about 9.5.

In the system according to the invention, waste water is impounded in a first treatment zone. The first treatment zone will include biological organisms that are capable of utilizing nitrate in anabolic metabolic process, thereby removing dissolved nitrate from the water and assimilating such nitrate into biomass. It is preferable that the biological organisms in the first treatment zone are capable of growing in the waste water without supplemental nutrients. Such biological organisms would preferably be autotrophic,—i.e. capable of synthesizing all materials essential for growth without supplementation of the waste water with carbohydrate, amino acids or vitamins. Photosynthetic organism such as microalgae which are tolerant of the ionic conditions of the waste water would be preferred. Various aquatic photosynthetic plants, algae and bacteria are known and would be suitable for this purpose.

By assimilating nitrate into the biomass of the biological organism contained in the first treatment zone, the concentration of nitrate in the impounded waste water is substantially lowered. The substantial lowering of nitrate content in the water flowing out of the first treatment zone is an important element of the invention since nitrate has been shown to strongly inhibit selenate removal in mud slurries containing organisms that reduce selenate to selenite and elemental selenium. The effluent from the first treatment zone will have nitrate concentrations in range below well 7mM ( about 5mg/liter). A nitrate ion concentration of 0.4 mM has been shown to permit selenate and selenite reduction to proceed with only partial inhibition. Therefore to enhance the efficiency of the process, the nitrate concentration of the effluent will preferably be established at less than 1 mM and preferably about 0.1 mM. The biomass produced in the first treatment zone may be subsequently processed and used as a nutrient supplement for organisms contained in the second treatment zone as described herein below.

The effluent from the first treatment zone, having a lowered concentration of nitrate may be pumped or gravity fed directly into a second treatment zone, or into an optional holding area where water is removed by any method. Preferably the water is removed through passive means, for example, by passive solar evaporation. The concentrations of selenate and selenite are effectively increased in this optional stage of the system; however, the concentration of nitrate (and nitrite) must be monitored to maintain a concentration that is not inhibitory for subsequent selenate or selenite removal. This optional step of concentrating selenium oxyanions may also be carried out prior to collecting the waste water in the first treatment zone either in lieu of or in addition to concentrating selenium oxyanions after treatment of the waste water in the first treatment zone.

The second treatment zone, is separate from the first treatment zone. The concentration of nitrate in the water coming into the second treatment zone will be monitored to be sure that it does not approach concentrations that inhibit the biological respiration of selenate to elemental selenium. The operational concentration of nitrate while respiring selenate to elemental selenium of no greater than 0.5 mM and the operational range of about 0.01 mM to 0.5 millimolar are preferred throughout the second treatment zone. A concentration of nitrate of up to about 1 millimolar may be circulated to the second treatment zone to maintain the selenate respiring microorganisms when selenate is exhausted, as is described further herein below.

At least a segment of the second treatment zone is configured to be maintained under substantially chemically reducing (anoxic) conditions as these conditions are required for microorganisms to carry out the biological respiration in which selenate is dissimilitorily reduced to elemental selenium. At least the anoxic segment of the second treatment zone is enriched with selenate respiring microorganisms. The term "selenate respiring microorganisms" as used herein means microorganisms that are capable of producing elemental selenium from waters comprising oxyanions of selenate (i.e. $SeO_4^{2-}$) The exact steps by which this process occurs are not fully understood. It is possible that one microorganism is capable of reducing selenate to elemental selenium. Alternately it is possible that two or more microorganisms are involved: a first that reduces selenate oxyanion to selenite oxyanion i.e. $SeO_3^{2-}$ and a second that converts selenite oxyanion to elemental selenium through further reductive processes.

Whatever is the precise mechanism for the reductive respiration of selenate to selenium, the second treatment zone is enriched for microorganisms capable of carrying out this process. The second treatment zone may be enriched for such microorganisms by seeding it with a microorganism culture that has been grown under conditions favoring the growth and multiplication of selenate respiring microorganisms. Alternatively, the enrichment process may be carried out by placing an unenriched culture of microorganisms that contains selenate respiring microorganisms in the second treatment zone under anoxic conditions and growing the culture in a medium under conditions that favor the growth and multiplication of selenate respiring microorganisms. It is preferred that the second treatment zone will be initially seeded with the culture enriched with selenate respiring microorganisms.

The growth and multiplication of selenate respiring microorganisms is favored by conditions of relatively high selenate concentration. Under conditions of high selenate concentration, the growth and multiplication of sulfate utilizing microorganisms is significantly inhibited and the number of selenate respiring microorganisms increases. Selenate concentrations exceeding 1 mM substantially inhibit the growth of sulfate reducing bacteria. It is preferred to grow the culture in a medium having a selenate concentration of 10 mM or greater. A selenate concentration of 20 mM has been used for this purpose.

In either case, the conditions whereby the desired enrichment of selenate respiring microorganisms occurs, will include a relatively high concentration of selenate and a substrate that can be readily oxidized to provide ultimate reduction of selenate to elemental selenium directly or through at least one intervening step of selenate to selenite to elemental selenium.

It is preferred that the enrichment conditions include a high concentration of selenate, as described above, one which is inhibitory of the growth of microorganisms that reduce sulfate. The enrichment conditions will also include substrates that are readily oxidizable by microbiological processes. Appropriate substrates of this type include hydrogen and dissolved salts of acetate and lactate. Sodium acetate in a concentration of about 1-3 grams per litre is useful for the enrichment conditions; a concentration of about 2 grams sodium acetate per liter is preferred.

Microorganisms used for growing enrichment cultures of selenate respiring microorganisms can be obtained from a variety of environments. By obtaining sediment samples that include selenate reducing bacteria from an environment where the water has a composition of dissolved ions similar to the waste water to be treated in the method according to the invention, a preadapted culture of selenate respiring bacteria can be established in the second treatment zone. Sedimentary mud from a variety of environments may be used as a source from which enriched and optionally preadapted cultures of selenate respiring microorganisms may be initiated. Mud from fresh water lakes, intertidal or littoral zones of marine environments such as bays and estuaries, hypersaline and alkaline lakes are appropriate sources. Mud from environments that receive selenate containing waste waters are particularly good sources of initial inocula appropriate for enrichment culturing. Mud from ponds, catchment basins and reservoirs receiving agricultural waste water runoff containing selenate are particularly good sources for such initial inocula. In addition, highly alkaline (pH 9.8) and saline (~ 80 g/l) muds can also serve as suitable inocula for the production of a preadapted enrichment culture for the treatment of highly alkaline and saline selenate-containing waste waters. Thus, the enrichment can be tailored to the chemical conditions of the waste water, which often is both saline and alkaline.

Initial inocula will be grown under enrichment conditions as described above and will be expanded until a seed culture of sufficient volume and concentration of selenate respiring microorganisms is obtained. A concentration of $4 \times 10^3$ cells per ml selenate reducing cells can be obtained after 6 weeks of growth under enrichment conditions. The seed culture will then be placed in the second treatment zone with sufficient growth medium to allow the selenate respiring microorganisms to entrain and be retained in the matrix of the second treatment zone.

The second treatment zone may be any closed or partly closed configuration wherein substantially anoxic conditions can be established and maintained. By substantially anoxic conditions is meant that no free gaseous or dissolved oxygen is present.

A fixed bed or fluidized bed closed reactor system can be used as the second treatment zone. A series of baffles in the base of the reactor will direct the flow of waste water through the reactor bed in the desired direction. The reactor bed will be filled with a stable or movable matrix depending upon whether the reactor is a fixed or fluidized bed reactor. The second treatment zone may also be in the form of a system of sinusoidally bent tubes having therein a fixed matrix in which the microorganisms enriched for selenate respiration are entrained.

Appropriate matrix materials may be any supporting material that is substantially inert in the metabolism of the microorganisms entrained in the reactor. The material will be in a form such that it forms pores or is itself porous, has a relatively large surface area and allows liquid to move through the matrix. Appropriate materials include inert plastic beads, spun plastic fibers, glass wool, mineral rock fiber wool, gravel, vermiculite and the like.

A source of iron ion $Fe^{+2}$ may be added as elemental iron or steel wool to the matrix or as a dissolved solution. $Fe^{+2}$ is believed to complex with the intermediate oxidation state of selenium oxyanion selenite and this is a form of selenium that would be recoverable from the second treatment zone in addition to elemental selenium.

The second treatment zone will also have an inlet means for supplying processed biomass from the first treatment zone as a stream of assimilable carbon, nitrogen and trace materials to the to the microorganisms resident in the second treatment zone. By supplying processed biomass from the first treatment zone as a nutrient supply, the present invention obviates the requirement for augmenting the selenate respiring microorganisms with a further source of exogenous nutrients. Considerable savings in the cost of running the selenium respiration process according to the invention can be obtained. The processed biomass obtained from the first treatment zone will provide additional amounts of simple oxidizable substrates such as acetate, lactate and hydrogen which will provide additional reducing potential for the reduction of selenate and selenite to selenium.

In another embodiment of the invention at least one microorganism that produces hydrogen sulfide is provided to a sulfate treatment zone. In this embodiment of the invention the waste water contains a high concentration of sulfate and a concentration of selenate sufficiently low that the activity of sulfate reducing microorganisms is not significantly inhibited by the selenate. In this embodiment of the invention, the waste water stream flowing into the first treatment zone, or flowing out of the first treatment zone, and into the second treatment zone may be treated, if necessary, to achieve a concentration of selenate that does not inhibit the activity of sulfate reducing microorganisms. Alternately, water flowing out of the second treatment zone containing high concentrations of sulfate but low concentrations of selenate may be supplied to the sulfate treatment zone.

Sulfate reduction is carried out also under substantially anoxic conditions to produce hydrogen sulfide. The source of electrons used in the reductive process may be lactate and acetate produced by processing a portion of the biomass accumulated in the first treatment zone and circulating the treated biomass into the sulfate treatment zone. The hydrogen sulfide produced in the sulfate treatment zone may be partially or completely stripped from the treated waste water by bubbling a stream of hydrogen or nitrogen gas through the waste water and collecting the nitrogen and hydrogen sulfide. If all of the hydrogen sulfide is not stripped by this process, the waste water will also have hydrogen sulfide dissolved therein. The waste water leaving the sulfate treatment zone will be monitored to have a dissolved hydrogen sulfide concentration in a range of 1-3mM. The treated waste water from the sulfate treatment zone comprising dissolved hydrogen sulfide can also be directed under anoxic conditions to the second treatment zone where the dissolved hydrogen sulfide the selenate reducing microorganisms and the reducing potential created thereby is used to further chemically reduce selenite to selenium.

The gasses collected from the sulfate treatment zone which include hydrogen sulfide can be slowly bubbled into the treated waste water as it flows through the second treatment zone enriched with selenate respiring microorganisms. Hydrogen sulfide bubbling through the treated waste water in the second treatment zone chemically reduces any residual selenite to selenium in the second treatment zone.

Because the concentrations of selenate in waste water are generally low, in the sub millimolar concentration range, it is possible that a high-efficiency selenate removal process based on microbial respiration of selenate will completely deplete the available selenate. In the absence of selenate as an electron acceptor, an alternate source of electron acceptors may be required to sustain the population of selenate reducing microorganisms in the second treatment zone.

Nitrate can function as such an electron acceptor to sustain the bacterial respiratory process under anoxic conditions; however, it is not possible to carry out selenate respiration in the presence of dissolved nitrate concentrations of 1 mM. To circumvent this problem selenate and nitrate may be alternately cycled through the second treatment zone. This may be done in a number of different ways. For example once the concentration of selenate in the second treatment zone has been substantially depleted, a stream of nitrate-containing waste water or processed biomass from the first treatment zone may be circulated through the second treatment zone, allowing the selenate respiring microorganisms to recover. Following this recovery period, selenate-containing waste water can once again be directed into the second treatment zone. To increase the efficiency of the process, it may be advantageous to use a plurality of second treatment zones and to alternate cycles of selenate respiration and nitrate respiration in a sequence so that a second treatment zone with population of recovered selenate respiring microorganisms is always available. Elemental selenium can be recovered from the digestor by physical (e.g., gravity) or chemical (e.g., solvent extraction) means for sale for industrial purposes.

EXAMPLES

The following examples are set out to illustrate certain aspects of the invention and are not intended by the inventor to be limiting.

EXAMPLE 1

Radiometric Assay for Selenate Removal

Assays for selenate removal using $^{75}SeO_4^{2-}$ were conducted as follows in all experiments described below. The sediment was allowed to reach room temperature after which a jar containing the sample was opened and the porous sediments were stirred with a spatula to achieve consistency. The sediment was then drawn up into 5 ml plastic (Plastipak) syringes (hub end removed; volume of sediment =3 ml) and capped with a rubber serum cap. Killed controls consisted of twice-autoclaved sediment (121° C. and 250 Kpa for 30 min: followed 14 hours later by a 20 min. treatment just prior to the start of the experiment) which were cooled and syringe-filled as described above. Samples were injected with 2.0 u Ci/100 ul of $^{75}Se$-selenate ($H_2^{75}SeO_4$, specific activity 8033 mCi/mM; New England Nuclear, Boston, Mass.) in a 1 M solution of NaCl under $N_2$. An additional experimental treatment consisted of injecting unlabelled selenate with the radioisotope to yield a final sediment selenate concentration of 17 nmoles/ml sediment. During the incubation, triplicate sets of samples were extruded into disposable centrifuge tubes (15 ml) containing 7 ml of the 1 M NaCl solution plus a cold chase of 1 mM $Na_2SeO_4$. The tubes were capped, vortexed (to disperse the sediment), and 1 ml of the slurry was withdrawn to determine the total counts added. The slurry was centrifuged (4000×g for 5 min), the supernatant discarded, and the pellet rinsed twice with small volumes of the saline chase solution before being resuspended in 3 ml of the wash solution and centrifuged again. After the second centrifugation, the bottom section of the tube containing the pellet was placed in a scintillation vial, severed and counted. There was no detectable quenching of counts since $^{75}Se$ is a gamma emitter.

EXAMPLE 2

Medium for enriching cultures with selenate-respiring microorganisms

The medium as described in Oremland et. al., 1989., Selenate Reduction to Elemental Selenium by Anaerobic Bacteria in Sediments and Culture: Biogeochemical Significance of a Novel, Sulfate-Independent Respiration. Appl. Environ. Microbiol. 53:1365-1369, has the following composition in grams/liter (g/l) of deionized water: NaCl (20.5) $MgCl_2$ $6H_2O$ (5.0), $NaHCO_3$ (1.0), $Na_2SeO_4$ (3.8), $K_2HPO_4$ (0.225), $CaCl_2$ $2H_2O$ (0.04), $(NH_4)2SO_4$ (0.225), $MgSO_4$ $7H_2O$ (0.09), Na acetate (2.72), cysteine-HCl (0.06), $Na_2S$ $9H_2O$ (0.06), and solutions of trace elements (9ml) and vitamins (ml) as described in E. A. Wolin, M. J. Wolin and R. S. Wolfe, *J. Biol. Chem.*, 121, 184 ( 1963) which is herein incorporated in its entirety by reference. The above-described media was supplemented with 20mM selenate as the electron acceptor. The media were dispensed under $N_2/CO_2$ (4:1), into serum bottles or tubes, crimp-sealed and autoclaved.

Slow growing enrichment cultures were obtained by inoculating this simple medium with sediment from an experimental slurry and maintaining the culture under anoxic conditions. The slurry was obtained either from a core sample of San Francisco Bay intertidal mud flat or as samples taken from bottom mud of a San Joaquin Valley evaporation pond west of Fresno, Calif., which receives selenate-containing agricultural waste water.

The slurries were treated as follows prior to their use as initial sources for enrichment cultures described below in this example. Slurries containing 21mM sulfate were incubated under $H_2$ or $N_2$ atmospheres. After a 4-day incubation, H-incubated slurries removed 95% of the added 0.29 mM selenate while there was little loss in the $N_2$ slurries. However, after 7 days and irrespective of the atmosphere, all removed greater than 99.7% of the added selenate. Table 1 and FIG. 1.

TABLE 1

Removal of selenate from solution during incubation of San Francisco Bay sediment slurries
Conditions Exp. #1: Slurries with 21 mM $SO_4^{2-}$ under $N_2$ or $H_2$:

| | SELENATE (mM)[A] | | |
|---|---|---|---|
| | 0 Days | 4 Days | 7 Days |
| $N_2$ | 0.39 (0.05) | 0.36 (0.05) | <0.001 |
| $H_2$ | 0.23 (0.03) | 0.01 (0.02) | <0.001 |

[A]represents the means of 3 samples and parenthesis indicate 1 standard deviation Densities of live cells in selenate-grown cultures reached $4 \times 10^9$ cells per ml after 6 weeks as determined by acridine orange direct counts according to the method of J. E. Hobbie, R. J. Daley and S. Jaspar, *Appl. Environ. Mircobiol.*, 33, 1225 (1977), which is herein incorporated by reference. By comparison, inoculation of selenate-free media ($\leq 0.2$ mM $SeO_4^{2-}$ due to inoculum carry-over) resulted in cell densities of only $1.8 \times 10^7$ cells per ml.

During growth, the enrichments produced either a red or black precipitate, the abundance of which increased with time. The more commonly observed red precipitate was soluble in $CS_2$ and could be solubilized by $SO_3^{2-}$. Analysis of both types of precipitates by scanning electron microscopy/ x-ray fluorescence revealed amorphous (red) or crystalline (black)) particles in which only Se was detected, indicating that the precipitates were elemental Se. X-ray diffraction analysis of the black precipitate revealed that the crystal was composed of hexagonal $Se^0$. In cultures, the initial red precipitate was sometimes observed to change into the black precipitate over time. No precipitate was formed in uninoculated media.

EXAMPLE 3

Selenium respiration by enriched cultures

After 6-9 weeks of incubation, the enrichment cultures removed up to 80% of the available selenate as determined by tracer experiments with $^{75}SeO_4^{2-}$ using the assay described in Example 1. Selenate removal and precipitate formation was inhibited by addition of alternate electron acceptors including 20 mM nitrate, 20 mM trimethylamine oxide, and air; however, 20mM sulfate had no effect.

The $Se^0$ recovery from selenate reduced in a culture incubated for 9 weeks was calculated to be 107% as follows. Assuming a cell density of $5 \times 10^9$ cells/10ml media, and a cell volume of $0.113$ um$^3$ for spherical cells with a 0.6 um diameter, the total cellular volume would be approximately $0.57 \times 10^9$ um$^3$. Using a conversion factor of $5.6 \times 10^{-13}$ gC/um$^3$ and assuming that C equals half of the cellular dry weight, this gives a total bacterial dry weight of 0.63 mg. The dry weight of the washed red precipitate from the culture tube was 9.0 mg and the residual selenate after 9 weeks incubation was 10.1 mM, indicating the removal of 9.9 mM selenate (approximately 7.82 mg Se per tube). Thus the net Se weight of the precipitate (8.37 mg divided by the expected weight (7.82 mg) yields a recovery of 107%. Considering the certainties of this calculation, it reasonably demonstrates that selenate removal from solution is accounted for by its recovery in the $Se^0$ precipitate.

EXAMPLE 4

Characterization of selenate respiring microbial isolate

The enrichment culture of the preceding example was streaked onto agar roll tubes and after 2 weeks, isolated red colonies were evident. A colony was picked and successfully transferred back to liquid medium. The culture consisted only of small coccoid organisms (diameter approximately 0.6 um) which were coated with red elemental selenium. The culture grew rapidly in media with nitrate or trimethylamine oxide as electron acceptors, but growth was much slower with selenate. No growth occurred under an air atmosphere.

EXAMPLE 5

Experiments with sediment slurries

Intertidal San Francisco Bay sediments were homogenized under $N_2$ with an equal volume of artificial bay water (ABW) with or without 21mM sulfate (pH of the ABW was 7.3). ABW is described in Oremland, R. S., and S. B. Polcin. 1982, Methanogenesis and sulfate reduction: competitive and non-competitive substrates in estuarine sediments. *App. Environ. Microbiol.* 44 :1270-1276., which is herein incorporated by reference. Sulfate-free slurries were prepared by homogenization in sulfate-free ABW, followed by centrifugation, rinsing, and resuspension of the compacted sediment in sulfate-free ABW. The homogenate was dispensed (15ml) into serum bottles (122ml) containing an additional 50 ml of ABW. Soluble substrates (glucose, sodium acetate, sodium lactate, sodium succinate), or electron acceptors $Na_2SeO_4$, $NaNO_3$, $NaSO_4$, FeOOH, $MnO_2$) were added to the slurries at the final concentrations indicated below. Additional controls consisted of autoclaved sediments 250 KPA and 121° C. for 30 minutes). Hydrogen was also employed as an electron donor by replacing the $N_2$ gas phase. Consumption of $H_2$ during the incubations was monitored by uptake from glass syringes. The slurries were crimp-sealed under $H_2$ or $N_2$ and incubated in the dark at 20° C. with rotary shaking. Subsamples were periodically withdrawn by syringe, centrifuged, filtered and stored at 4° C. until analyzed for selenium oxyanions as described above.

A. Effect of Various Electron Donors

The effect of several soluble electron donors glucose, acetate, lactate and succinate on the removal of selenate (1.22 mM) from solution was examined. After 5 days of incubation, unamended sediments removed 58% of the added selenate while lactate- and acetate-amended slurries lost 100 and 95%, respectively. Succinate did not significantly speed the reaction, while glucose appeared to have retarded selenate removal over that of the unsupplemented slurries. Significant quantities of selenite (0.160 to 0.272 mM) were present in the unamended acetate and succinate slurries at the end of the experiment. These results are shown in Table 2.

TABLE 2

Effects of various electron donors on Selenate Reduction in San Fransisco Bay sediment Slurries after 5 days of incubation[a]

| Addition (10 mM) | $SeO_4^{2-}$ (mM) | $SeO_3^{2-}$ (mM) | $SeO_4^{2-}$ lost (%) |
|---|---|---|---|
| None | 0.510 (0.010) | 0.150 (0.020) | 58 |
| Lactate | 0.005 (0.001) | 0.002 (0.000) | 100 |
| Acetate | 0.058 (0.097) | 0.272 (0.192) | 95 |
| Succinate | 0.262 (0.380) | 0.200 (0.143) | 79 |
| Glucose | 0.817 (0.081) | 0.001 (0.000) | 33 |

[a]Values indicate the mean of 3 samples and parenthesis indicate 1 standard deviation.

B. Effect of Electron Acceptors

The effects of several alternative electron acceptors on the removal of 5 mM selenate from sulfate-free slurries held under $H_2$ was investigated. These results are shown in FIG. 2. Selenate removal was evident by day 4 in the unamended and FeOOH samples, and selenate disappeared completely by day 7 in these samples as well as those containing $SO_4^{2-}$. Nitrate completely inhibited selenate removal during the incubation and a partial inhibition (approximately 72%) was achieved with $MnO_2$. A distinct color change to reddish brown was evident in all slurries except those amended with $NO_3^-$ or $MnO_2$. This indicated that selenate was reduced to red elemental selenium. Significant levels of selenite were observed in some of the experimental flasks during the experiment. The highest values (0.76 to 1.3 mM) occurred by day 4 of the incubation in the unamended and the FeOOH-containing slurries and on day 7 in the sulfate-containing slurries (0.1 to 1.0 mM). No significant levels of selenite were observed in the slurries containing nitrate of $MnO_2$.

EXAMPLE 6

Respiration of [$^{14}C$]acetate by sediment slurries

An anaerobic ($N_2$ gas phase) culture of an isolated colony of the isolate described above respired selenate when growing on acetate. Culture tubes containing the above described enrichment medium but with various concentrations of selenate ranging from 0-20mM and 2.5 microcuries of (2-$^{14}C$)-acetate up to a molar concentration of 20 mM acetate were inoculated with 0.2ml of a growing culture (maximum $SeO_4^{2}$ carry-over$\leq 0.1$ mM.) After 28 days incubation at 20° C., the tubes were injected with 1.5 ml 6 N HCl, vigorously shaken, and after 2 hours analyzed for $^{14}CO_2$ by radio-gaschromatography as described by C. W. Culbertson, A. J. B. Zehnder and R. S. Oremland, *Appl. Environ. Microbiol.*, 41, 396 (1981), which is herein incorporated by reference. Progressively more red $Se^0$ was evident in tubes containing higher initial levels of selenate and progressively more $^{14}CO_2$ was detected with increasing selenate (FIG. 3). Recovery of $^{14}CO_2$ was linear up to 2 mM, after which counts still increased, but at a slower rate. The culture incubated in 20 mM selenate oxidized 45% (0.090 mmoles per tube) of the available acetate to $CO_2$.

EXAMPLE 7

Removal of Selenate by a Variety of Sediments

Sediments from a variety of sampled environments were tested for selenate removal using the assay method described in Example 1. Sediments from the following environments were tested under the listed conditions of pH and salinity for the ability to convert selenate to elemental selenium.

TABLE 3

| Sediment Sample | Solid Phase $[Se]_{total}$ (ppm) | pH | Salinity g/l | $SeO_4^{2-}$ reduction nM $^{75}Se^*hr^{-1}ml^{-1}$ | $^{75}SeO_4$ immobilized (% of Massie Sl.) |
|---|---|---|---|---|---|
| Massie slough | 3.8 ± 0 | 7.3 | 1 | 22.07 | 100% |
| Big Soda Lake | 1.5 ± 0 | 9.7 | 27 | 3.57 | 16.2% |
| Lead Lake | 0.1 ± 0 | 7.1 | 8 | 3.01 | 13.6% |
| Searsville Lake | — | 8.3 | 1 | 1.91 | 8.6% |
| Hunter Dr | 1.1 ± .1 | 7.6 | 60 | 0.74 | 3.3% |
| June Lake | 0.4 ± 0 | 7.2 | 2 | 0.51 | 2.3% |
| S. F. Bay | — | 8.0 | 27 | 0.41 | 1.8% |
| Big Soda Lake bottom | 11 ± 0 | 9.8 | 89 | 0.21 | 0.9% |
| S. F. Bay salina | — | 7.9 | 250 | 0.12 | 0.6% |
| Mono lake | 0.7 ± 0 | 9.8 | 84 | 0.07 | 0.3% |
| Road side salina | 0.6 ± 0 | 9.6 | 320 | <0.01 | 0.03% |

Although there are reports of $Se^0$ precipitation from selenate by various bacterial isolates, the present work constitutes the first report of selenate-linked respiration. Other particular embodiments of the invention, which is claimed herein below, can be made by those familiar with the arts to which the invention pertains with out departing from the scope of the invention disclosed and claimed by the inventor.

I claim:

1. A method for the removal of selenium from agricultural waste waters wherein said agricultural waste waters comprise selenium and nitrate, comprising the steps of providing a first treatment zone, said first treatment zone comprising biological organisms capable of removing said nitrate from said waste water and assimilating said nitrate into biomass, treating said agricultural waste water in said first treatment zone under aerobic conditions until the concentration of nitrate in effluent from said first treatment zone is substantially reduced in a range about 1 to 0.1 mM.

providing a second treatment zone, said second treatment zone removed from said first treatment zone, said second treatment zone comprising substantially anoxic conditions and biological organisms enriched for biological organisms that respire selenate under substantially anoxic conditions treating the effluent from said first treatment zone in said second treatment zone until the concentration of selenate in effluent from said second treatment zone is substantially reduced in a range about 0.01 to 0.001 mg/l.

2. A method according to claim 1 wherein said agricultural waste water comprises in addition sulphate, and wherein said selenate concentration is sufficiently high that sulfate reduction in said second treatment zone is substantially inhibited.

3. A method according to claim 1 wherein said agricultural waste water comprises in addition sulphate, and wherein said sulphate is biologically reduced to hydrogen sulfide in a sulphate treatment zone to provide additional reducing potential and to further reduce residual selenite.

4. A method according to claim 1 wherein the biological organisms capable of removing said nitrate from said waste water and assimilating said nitrate into biomass are autotrophs.

5. A method according to claim 4 where said autotrophs are photosynthetic.

6. A method according to claim 5 wherein said autotrophs are algae.

7. The method according to claim 4 wherein said biomass is converted to assimilable nutrients and is provided to the organisms of the second treatment zone.

8. The method according to claim 7 wherein said biomass nutrient includes nitrate and is provide periodically at a concentration sufficient to sustain the biological organisms that respire selenate during periods when the concentration of available selenate is insufficient to sustain the biological organisms that respire selenate.

9. The method of claim 1 wherein prior to treating said waste water in said first treatment zone selenium is concentrated.

10. The method of claim 9 wherein said concentrating step is accomplished by evaporative removal of water.

11. The method of claim 1 wherein prior to treating said effluent in said second treatment zone selenium is concentrated.

12. The method of claim 11 wherein said concentrating step is accomplished by evaporative removal of water.

13. The method of claim 1 wherein said biological organisms that respire selenate are enriched by at least one microorganism that oxidizes acetate and hydrogen.

* * * * *